2,831,503
DUAL CONDUIT VALVE AND FITTING

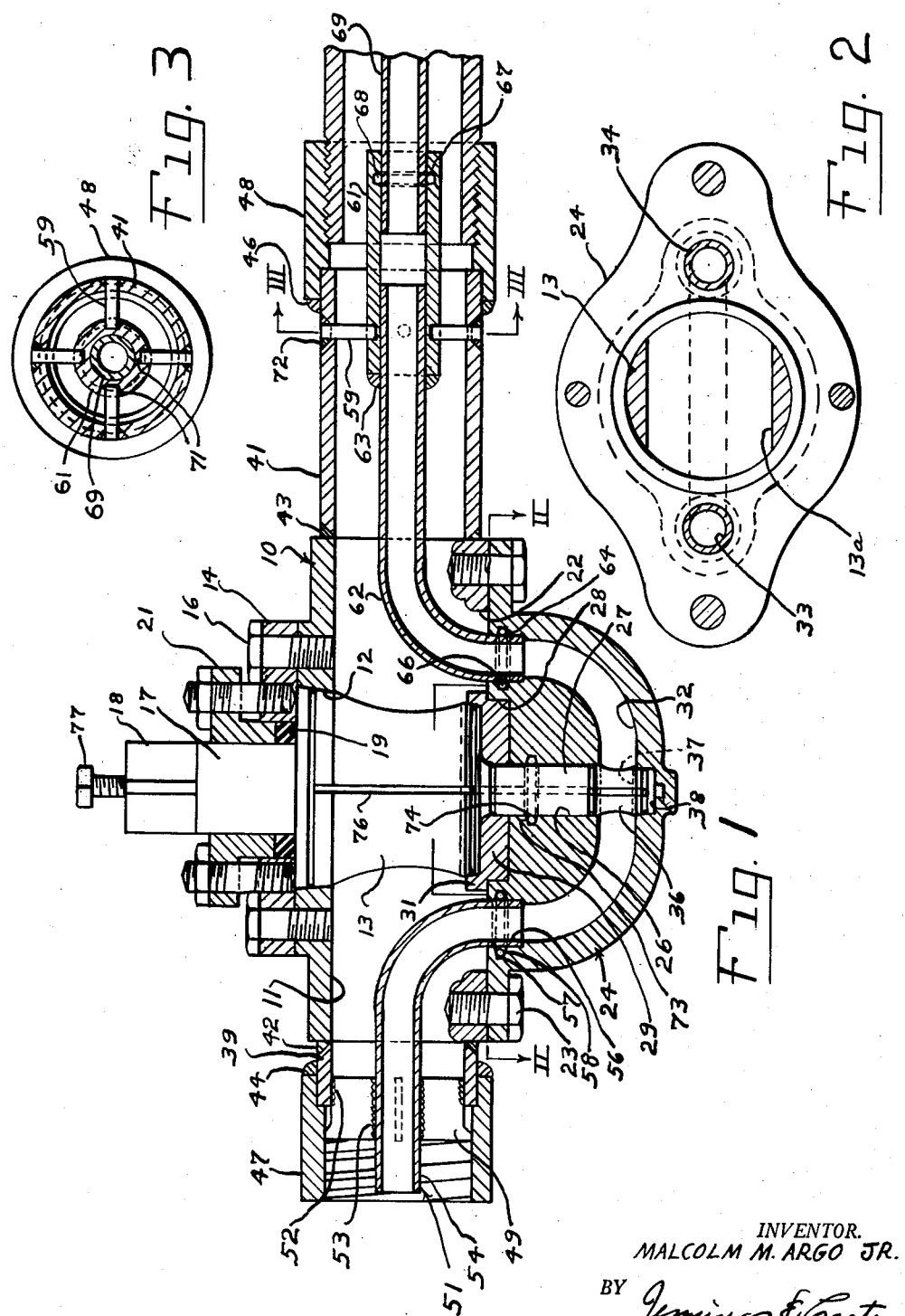
April 22, 1958    M. M. ARGO, JR    2,831,503
DUAL CONDUIT VALVE AND FITTING
Filed April 20, 1956
INVENTOR.
MALCOLM M. ARGO JR.
BY *Jennings & Carter*
ATTORNEYS

United States Patent Office 2,831,503
Patented Apr. 22, 1958

Malcolm M. Argo, Jr., Birmingham, Ala.

Application April 20, 1956, Serial No. 579,473

2 Claims. (Cl. 137—625.19)

This invention relates to a dual conduit valve and fitting and more particularly to such a valve having separable parts together with improved means for connecting the fluid passages therethrough.

Another object of my invention is to provide a dual conduit valve which is simple of construction and operation and which requires a minimum of time to assemble and disassemble the same.

A further object of my invention is to provide a dual conduit valve of the character designated which may be readily installed in dual conduit lines, the inner pipe of the dual conduit being connected to the inner pipe of the valve upon connection of the outer pipe of the line to the valve housing.

Briefly, my improved dual conduit valve comprises a housing having a passage therethrough and a valve closure member within the passage for controlling the flow of fluid therethrough. A passageway is provided through the housing outwardly of the closure member with the ends thereof communicating with the passage through the housing at opposite sides of the closure member. Inner pipes are provided in the valve housing at opposite sides of the closure member with the inner end of each inner pipe telescoping within the adjacent end of the passageway. Sealing means is provided within the passageway adjacent the ends thereof adapted to seal about the telescoping ends of the inner pipes and a closure member is provided within the passageway for controlling the flow of fluid therethrough.

Apparatus embodying features of my invention is illustrated in the accompanying drawings forming a part of this application, in which:

Fig. 1 is a vertical sectional view through the dual conduit valve;

Figure 2 is a sectional view taken generally along the line II—II of Fig. 1; and, Fig. 3 is a sectional view taken generally along the line III—III of Fig. 1.

Referring now to the drawings for a better understanding of my invention, I show a valve housing indicated generally at 10 having an opening 11 therethrough for the passage of fluid. An inwardly tapered opening 12 is provided in one side of the housing 10 forming a seat for a suitable closure member, such as a valve plug 13 having an opening 13a therethrough for the passage of fluid. The valve plug is held in position by a retaining ring 14 and cap screws 16. Projecting outwardly of the plug 13 is an actuating stem 17 having a suitable head 18 thereon for receiving a handle or actuating tool, such as a wrench or the like. Positioned between the stem 17 and the inner surface of the ring 14 is a suitable packing ring 19 which is held in place by a gland follower 21.

The valve housing 10 is provided with an enlarged opening 22 on the side thereof opposite the opening 12. Secured to the housing 10 by means of cap screws 23 is a removable base 24 which is adapted to close the opening 22 in the housing. As shown in Fig. 1, the base 24 is provided with a relatively deep recess 26 for receiving a projecting stem 27 carried by the valve plug 13. Preferably, the stem 27 and stem 17 are both formed integrally with the plug 13. A relatively shallow recess 28 is provided in the base 24 for receiving an annular member 29 having an inwardly extending annular flange portion 31 which engages the lower portion of the valve plug 13, as shown.

A passageway 32 extends through the base 24 with the ends 33 and 34 thereof positioned on opposite sides of the valve plug 13, as shown in Figs. 1 and 2. The passageway 32 is preferably U-shaped and communicates with the recess 26, as shown in Fig. 1. The stem 27 is provided with a valve closure member 36 in the form of a plug having a through opening 37 therethrough for the passage of fluid. The lower end of the stem 27 is supported in a suitable seat 38.

The housing 10 has short pipe sections 39 and 41 secured to opposite ends thereof as by welding at 42 and 43, respectively. Secured to the outer ends of the short pipe sections 39 and 41 as by welding at 44 and 46 are suitable coupling members 47 and 48, respectively. Supported within the pipe section 39, by means of a spacer member 49 and extending within the adjacent end of the housing 10 is an inner pipe 51. The spacer 49 is secured to the pipe section 39 and the inner pipe 51 as by welding at 52 and 53, respectively. The outer end 54 of the inner pipe 51 is concentric with the coupling 47 and is of a length to telescope within a suitable female connector of an adjacent dual conduit, not shown. The other end 56 of the inner pipe 51 is curved to form a substantially L-shaped portion which telescopes within the adjacent end 33 of the passageway 32. An annular recess 57 is provided in the walls of the passageway 32 for receiving a sealing ring 58 which preferably is of O-ring construction and slidably engages the telescoping end 56 of the inner pipe 51 to form a fluid tight joint between the inner pipe 51 and the passageway 32.

Supported within the pipe section 41 by means of suitable spacer members 59 is a sleeve or female connector 61 which is secured to one end of an L-shaped inner pipe 62 as by welding at 63. The other end of the inner pipe 62 telescopes within the adjacent end 34 of the passageway 32, as shown. A recess 64 is provided within the wall of the passageway 32 for receiving a sealing ring 66, such as an O-ring, which slidably engages the telescoping end of the inner pipe 62 to form a fluid tight fit between the inner pipe 62 and the passageway 32. An annular recess 67 is provided in the sleeve 61 for receiving a sealing ring 68 which is also preferably of O-ring construction and is adapted to engage the telescoping end 69 of a suitable dual conduit. As shown in Figs. 1 and 3 the spacer members 59 fit in suitable recesses 71 in the exterior surface of the sleeve 61 and are secured to the pipe section 41 as by welding at 72.

As shown in Fig. 1, an annular recess 73 is provided within the inner walls of the recess 26 for receiving a sealing ring 74 which engages the stem 27 to form a fluid tight seal therewith. Suitable lubricant passages 76 are provided in the stems 17 and 27 and the plugs 13 and 36 whereby lubricant may be supplied to the moving parts of the valve actuating mechanism, as shown. The lubricant passageway is closed by means of a suitable cap screw 77.

From the foregoing description, the assembly and operation of my improved dual conduit valve will be readily understood. The valve plug 13 is inserted into the housing 10 and the ring 14 is secured in place by means of the cap screws 16. The packing ring 19 and the gland follower 21 are then installed in the usual manner. With the inner pipes 51 and 62 supported in spaced relation to the inner walls of the valve housing 10, as described heretofore, the inner ends of the inner pipes project outwardly of the opening 22 in the valve housing. The base 24 is then installed by means of the cap screws 23 whereby the stem 27 enters the deep recess 26 and the inner ends of the inner pipes 51 and 62 telescope within the ends 33 and 34 of the passageway 32 and engage the sealing rings 58 and 66 to form a fluid tight joint between the inner pipes and the passageway 32. With the valve thus assembled, the stem 17 is turned by any suitable means, such as by a wrench, to position the openings 13a and 37 in selected positions whereby the flow of fluid through the passage 11 and passageway 32 is controlled. The outer or male end 54 of pipe 51 and the sleeve or female end 61 of the inner pipe 62 may be then attached to a female or male end, respectively, of an adjacent dual conduit thus completing the assembly of the valve in a dual conduit.

While I have shown the stem 27 carrying the closure member 36 as being carried by the valve plug 13, it will be apparent that the stem 27 could be formed separately from the plug 13 and separate means employed to rotate the closure member 36, whereby the plug 13 and closure member 36 could be operated independently of each other.

While I have shown my invention in but one form it will be obvious to those skilled in the art that it is not so limited, but is susceptible of various charges and modifications without departing from the spirit thereof and I desire, therefore, that only such limitations shall be placed thereupon as are specifically set forth in the appended claims.

What I claim is:

1. A dual conduit valve comprising a housing having a passage therethrough through which fluid is adapted to flow, a removable base attached to said housing, there being a recess in said base, a valve plug within said passage controlling the flow of fluid therethrough, a valve stem carried by said plug and projecting into said recess, a generally U-shaped passageway through said base in communication with said recess and adapted to communicate with the passage in said housing at opposite sides of the valve plug, a closure member carried by said stem controlling the flow of fluid through said passageway, an inner pipe within said passage at one side of said plug with its inner end substantially L-shaped and telescoped within the adjacent end of said passageway, a second inner pipe within said passage at the other side of said plug with its inner end substantially L-shaped and telescoping within the other end of said passageway, and sealing means within said passageway adjacent the ends thereof adapted to seal about the telescoping ends of said inner pipes.

2. A dual conduit valve as defined in claim 1 in which one of the inner pipes is provided with a male outer end which is of a length to telescope within a female connector of an inner pipe of a dual conduit, and a female connector is secured to the outer end of the other inner pipe for receiving the male end of an inner pipe of a dual conduit.

References Cited in the file of this patent

UNITED STATES PATENTS

| | | |
|---|---|---|
| 139,352 | Andreae | May 27, 1873 |
| 142,120 | Richardson | Aug. 26, 1873 |
| 152,397 | Messmer | June 23, 1874 |
| 173,695 | Varwig | Feb. 15, 1876 |
| 681,690 | Esterly | Sept. 3, 1901 |
| 1,241,159 | Spielman | Sept. 25, 1917 |
| 2,301,428 | MacNeil | Nov. 10, 1942 |
| 2,599,063 | Miller | June 3, 1952 |